United States Patent [19]
Hoeflinger et al.

[11] 3,981,086
[45] Sept. 21, 1976

[54] CARREL APPARATUS FOR USE IN LEARNING

[76] Inventors: Irene Burns Hoeflinger, 7 Joy Drive, Manhasset Hills, N.Y. 11040; Diana Cohen, 11 Knoll Lane, Glen Head, N.Y. 11545

[22] Filed: Oct. 25, 1974

[21] Appl. No.: 517,939

[52] U.S. Cl. .................................. 35/60; 312/305
[51] Int. Cl.² .................................... A47B 41/00
[58] Field of Search ............... 35/13, 60, 77, 62; 297/188, 194; 108/25, 26, 26.2; 312/97.1, 232, 235 R, 292, 305

[56] References Cited
UNITED STATES PATENTS

| | | | |
|---|---|---|---|
| 115,349 | 5/1871 | Palm | 35/60 |
| 232,599 | 9/1880 | Crandall | 35/60 |
| 817,956 | 4/1906 | Carman | 312/305 X |
| 1,148,616 | 8/1915 | Paul | 35/62 |
| 1,272,645 | 7/1918 | Fanning | 35/62 X |
| 1,889,976 | 12/1932 | Comins | 35/77 X |
| 1,954,632 | 4/1934 | Lehman | 35/62 X |
| 2,115,497 | 4/1938 | Mintz | 35/60 X |
| 2,138,190 | 11/1938 | Myers | 312/305 X |
| 2,446,601 | 8/1948 | Lelyveld | 312/235 R X |
| 2,575,766 | 11/1951 | Olson | 312/305 X |
| 2,603,549 | 7/1952 | Tessmer | 312/305 X |
| 3,152,848 | 10/1964 | Kalk | 35/60 UX |
| 3,263,347 | 8/1966 | McCutcheon | 35/60 |
| 3,366,415 | 1/1968 | Cooper | 35/60 UX |

OTHER PUBLICATIONS
Spiegel 1962 Xmas book, page 354 only.

*Primary Examiner*—Harland S. Skogquist
*Attorney, Agent, or Firm*—Bauer, Amer & King

[57] ABSTRACT

A teaching carrel comprising a desk having a cover movable to a down position wherein the top thereof provides a first learning area and to an open position wherein the underside thereof and the exposed desk top comprise, respectively, second and third learning areas. A manually rotatable drum having learning aids is included in the desk with the drum having a window for access to the drum. Various demonstration surfaces can be affixed to the second and third learning areas to demountably receive the learning aids. As the learner progresses, the cover is pivoted down whereby the first learning area and hence the carrel resemble the conventional desk.

17 Claims, 11 Drawing Figures

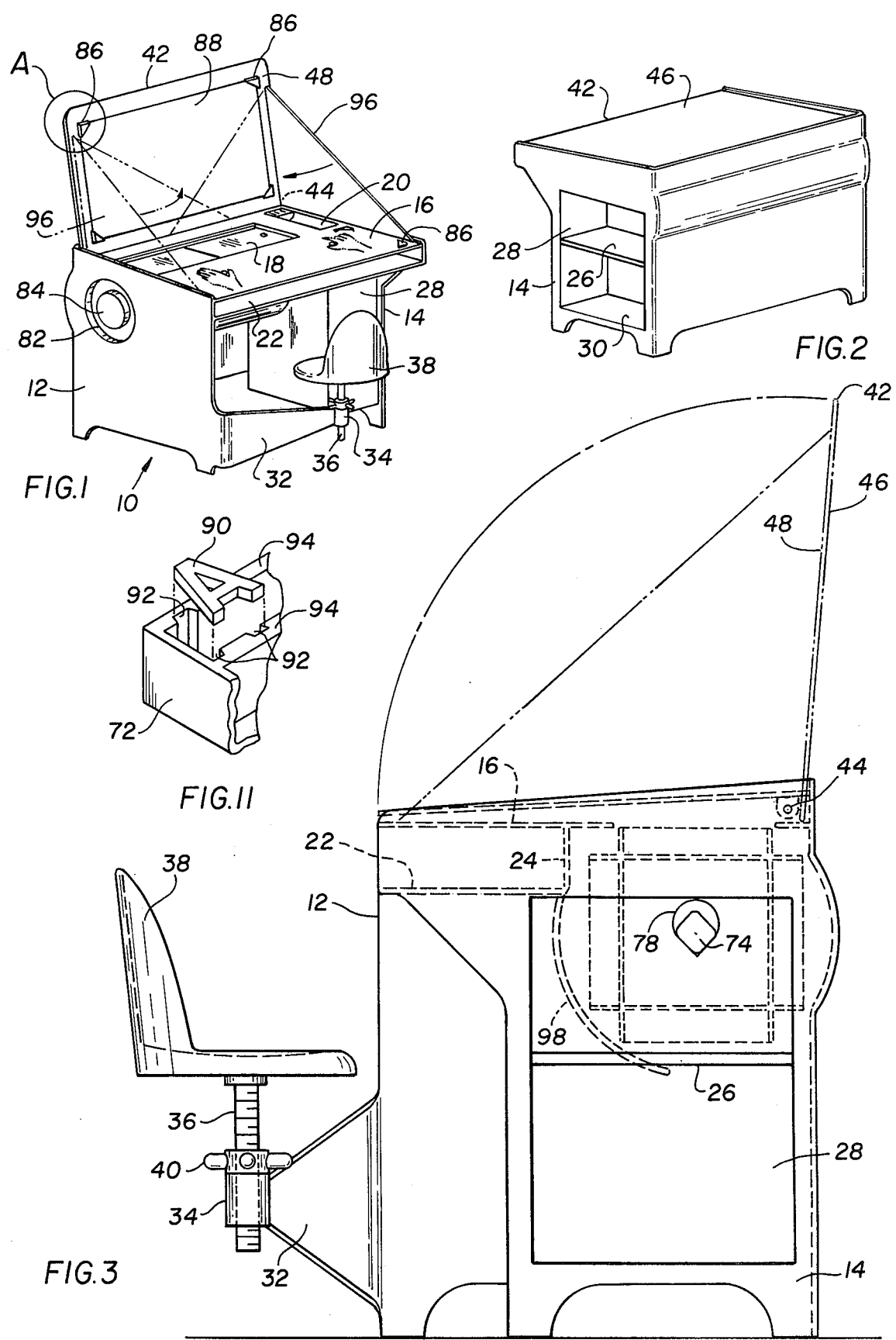

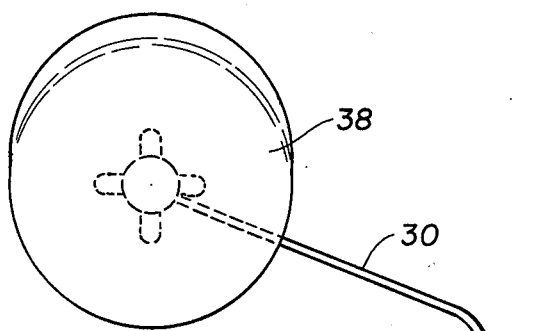
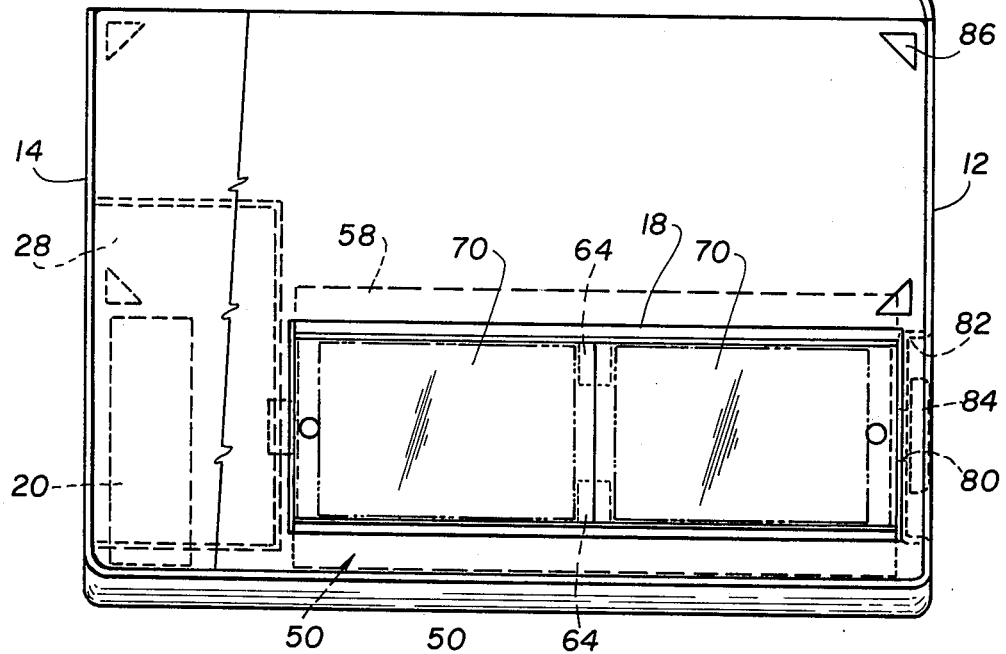
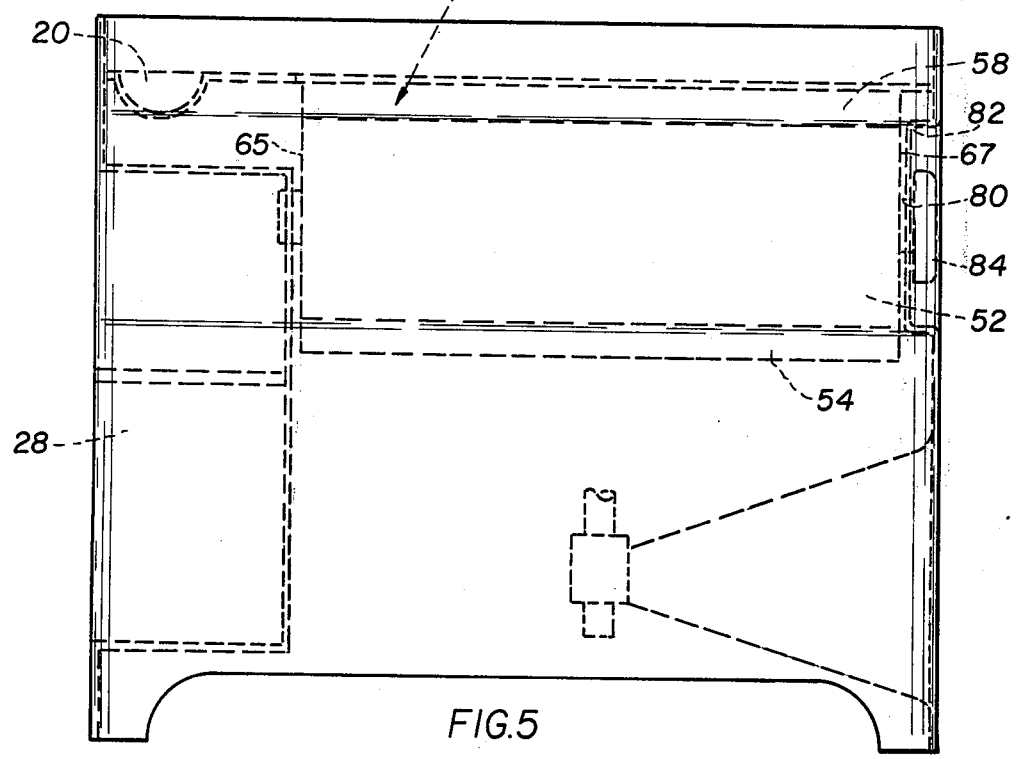

CARREL APPARATUS FOR USE IN LEARNING

This invention relates to learning aids and more particularly it relates to an instructional desk with carrel for children with learning deficiencies.

It has been found that some of the learning disabilities exhibited by problem learners stem from both perceptual and motor abnormalities. While the affected learner or child appears, at best, to be a slow learner, oftentimes his innate intelligence is comparable to his more normal peers. Yet, his medical problems prevent him from normally visualizing figures, colors and perceptual orientations. For example, such a child might perceive objects upside down, sideways or be unable to correlate the shape of an object seen to that of one felt.

It has been found that, by use of reinforced learning, many problem learners show marked dissipation of their perceptual problems. That is, where a child is able to actually touch, say, the letter 'B' while looking at an identical letter having the same orientation, eventually his perceptual dysfunction tends to lessen.

The problem has been twofold: The first, of course, is to diagnose the learning disability, after which a reinforced learning program can be prescribed. And, while the mechanism of how improvement occurs has yet to be fully explained, the fact is that much success has been realized through reinforced learning. The second problem has been providing the mechanism through which reinforced learning can be accomplished. Heretofore, apparatuses appear particularly ill-suited for this purpose, It is important that perspective distortion be kept to a minimum. Adequate storage, working and learning areas must be provided as well as means for displaying intended indicia or objects or contours. Then, too, privacy should be maintained and a means for isolation from adjacent visual distraction is desirable.

Generally then, the present invention provides a means for reinforced learning that includes a desk type structure having a hinged cover. In the closed or cover down position the top side of the cover acts as an advanced or first learning space. In the cover up or open mode the other or underside of the cover in conjunction with the now exposed desk top provides respectively individual and distinctly separate second and a third working areas or spaces. A compartmentalized rotatable drum is included in the desk and is so positioned therein, that by selective rotation of the drum the compartments are serially brought under, and correspond with a window provided in the desk top or third working space. The second and third working areas are adapted to receive card paneling, magnetic materials, chalk board, VELCRO supports and the like for supportably and detachably mounting demonstration objects thereat. Whereas the manually operable drum presents various teaching aids to the learner from which the aids can be removed and placed on either or both the second and third working areas at and from which the child can visually and tactually reinforce correct perception.

An adjustable seat is integral with the desk and disposed on an arm extending therefrom. Hence, correct placement of the learner is assured.

It is therefore an object of the present invention to provide a learning desk that is a self-contained laboratory for those with perceptual dysfunctions wherein correct perceptual orientation can be taught through reinforced learning.

It is another object of the present invention to provide a learning desk laboratory in the form of a carrel that includes a plurality of independent working or learning areas each of which is capable of displaying various learning aids.

It is a further object of the present invention to provide a desk type structure that includes a compartmentalized and selectively rotatable drum with access thereto from one of the aforesaid working areas.

It is a still further object of the present invention to provide an instruction carrel of modular construction, simple in design and inexpensive to manufacture.

Other objects and features of the present invention will become apparent from the following detailed description considered in connection with the accompanying drawings. It is to be understood however that the drawings are designed for purposes of illustration only and not as a definition of the limits of the invention for which reference should be made the appending claims.

In the drawings wherein similar reference numerals denote similar elements throughout the several views:

FIG. 1 is a perspective view of the inventive desk or carrel with cover open to expose separate learning areas;

FIG. 2 is a perspective view with cover down for utilization of another working surface;

FIG. 3 is an end view of the desk showing means to selectively stop drum rotation;

FIG. 4 is a plan view of the desk showing a drum compartment registered under the desk top window;

FIG. 5 is an elevational view showing placement of the compartmentalized rotatable drum;

Figure 6:
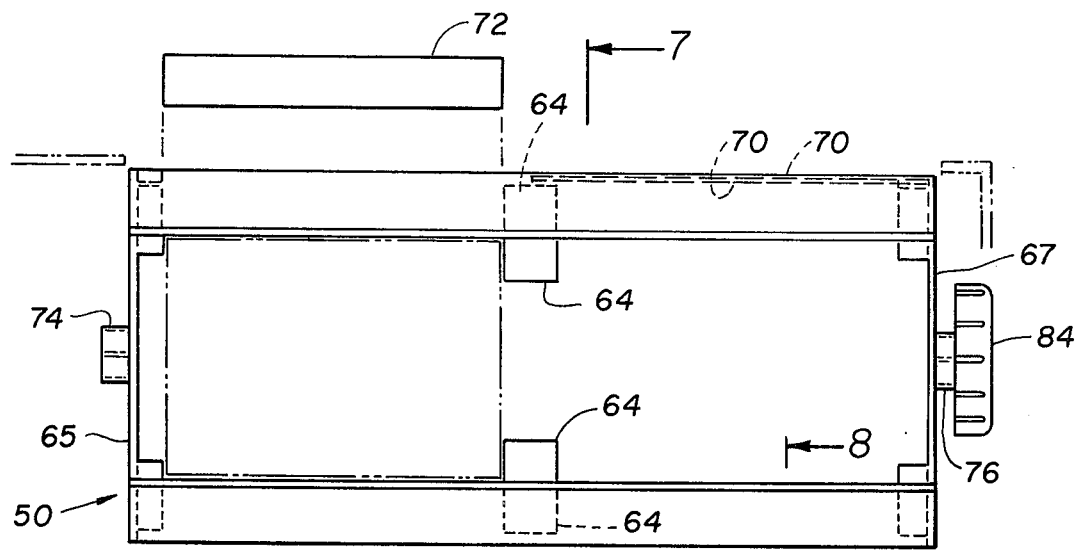
FIG. 6 is a plan view of the drum with same removed from the desk for purposes of clarity and showing removal of one of a plurality of trays.
Figure 7:
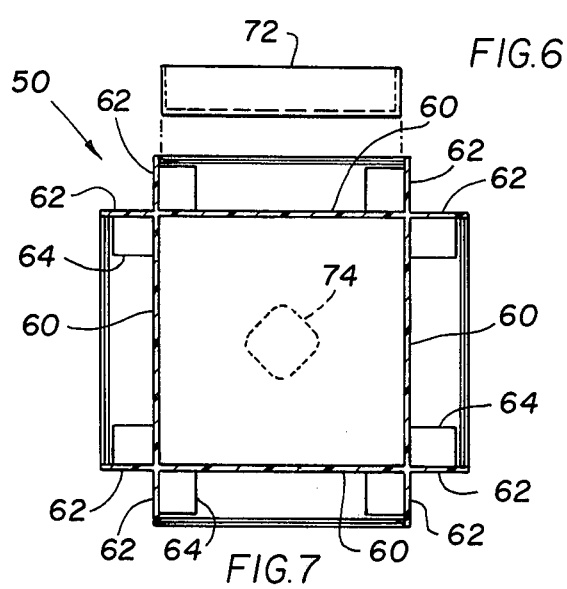
FIG. 7 is a view along line 7—7 of FIG. 6.

It is to be understood that the term carrel as used herein is intended to mean a demonstration area or study area, or both, for teaching and learning purposes. As such it is meant to encompass such structures as work tables, booths, desks and the like.

Referring now to the drawings and particularly FIGS. 1–3 there is shown the learning device of the present invention comprising a carrel or desk seen generally as reference numeral 10. Carrel or desk 10 includes a pair of spaced sides 12 and 14. Interposed between sides 12 and 14 and at the top is a desk top 16. Top 16 includes a window 18 generally of rectangular shape as well as a pencil well 20. A shelf 22 is spaced parallel to and downwardly from top 16 and has a rearward wall 24 abutting the underside of top 16 as shown to form an opening at the desk front for the convenient storage of books and other objects.

An adjustable shelf 26 sits in a compartment 28 with the latter projecting inwardly from the inside surface of side 14. Bottom flat 30 of compartment 28 will likewise be used as a shelf although obviously not adjustable. Integrally formed with and extending from side 12 is an arm 32, the free end of which carries a threaded yoke 34 into which screws one end of a threaded stem 36. A seat or stool 38 is attached to the other end of stem 36 with the stem also carrying a jamb nut 40. Hence, seat 38 can be secured at a convenient height by tightening nut 40 against yoke 34.

A desk cover 42 is hinged between sides 12 and 14 at hinge points 44 (FIG. 3) to pivot at its rearward portion whereby it assumes, as in FIG. 2, a closed or "down" position and assumes, as in FIGS. 1 and 3, an open or cover "up" position. In the closed or down position, the exposed top surface 46 of cover 42 acts as a first working surface or area. In the open or up position, the opposite under face 48 of surface 46 becomes a second working area. When the cover is open the exposed surface of top 16 comprises the third working or learning area.

Turning now to FIGS. 4 through 9 there is shown the rotatable compartmentalized drum, generally identified by reference numeral 50. In the preferred mode drum 50 may be rectangular in cross-section and may be divided into a plurality of generally rectangular compartments 52, 54, 56 and 58. Drum 50 is formed by joining complimentary sides 60 into an essentially square configuration. The sides are joined so that sills 62 extend therefrom with each sill projecting straight from its respective side to maintain orthogonality between adjacent sills. Partitions 64 divide each of compartments 52, 54, 56, and 58 into respective subcompartments.

Figure 8:
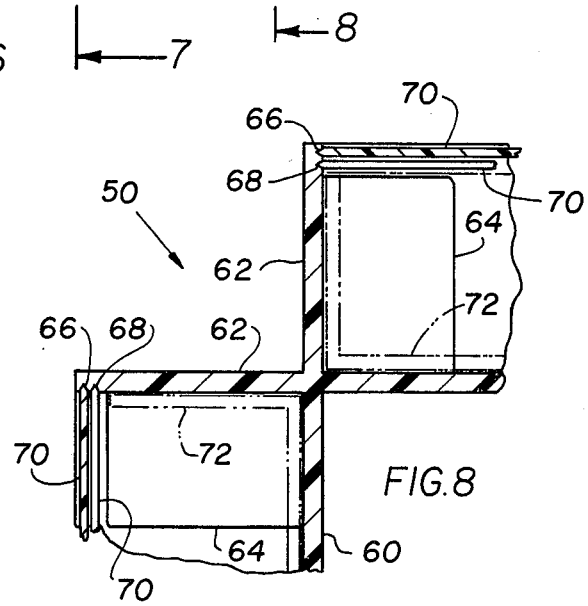
FIG. 8 is a view along line 8—8 of FIG. 6.
Figure 9:
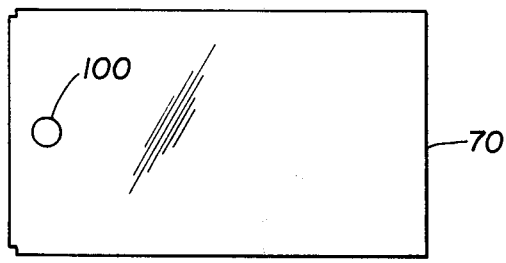
FIG. 9 is a compartment cover for the trays stored in the drum.

The inboard surface of each sill is formed with a pair of parallel grooves 66 and 68 more clearly seen in FIG. 8. A plurality of slide covers 70 are formed with edges complimentary with grooves 66 and 68. One of the covers is disposed between each groove pair 66, 66 and 68, 68 in each compartment. It will be noticed then that both slides 70 in each compartment remain parallel adjacent as they ride tracklike between their respective groove pair. And, each slide or cover 70 extends between an end wall and a partition.

A plurality of trays 72 are formed so as to fit in each subcompartment. The height of each tray extends from a respective side 60 to a slightly below a groove pair 68, 68. Hence by sliding a cover 70 over a subcompartment, the tray remains therein as the drum is revolved, described below. To facilitate sliding or moving the covers 70 a finger aperture 100 is formed therein.

Projecting from drum side 66 is an axle or trunnion 76 preferably of circular cross section. Axle 76 is carried in an aperture 80 with the aperture positioned centrally in a handle well 82. Well 82 is formed in side 12 with the former being recessed from the outboard face of the latter. A knob or handle 84 is attached to axle 76 and is positioned so as to be centered in well 82.

Another axle 74 projects from the other drum side 64. In one embodiment shown axle 74 has a squared cross section and, referring back to FIG. 3, rides in aperture 78 formed in wall 14. A portion of the periphery of aperture 78 is complimentary with a portion of the squared axle. Thus, as the drum is rotated a "stop" action is afforded by operation of axle 74 in aperture 78. Moreover, the peripheral sides of axle 74 coacting with the complimentary sides of aperture 78 mandates that one of the drum compartments registers with window 18 at each "stop." To isolate the drum from the foot space of the carrel a divider 98 is carried between sides 12 and 14.

Figure 10:
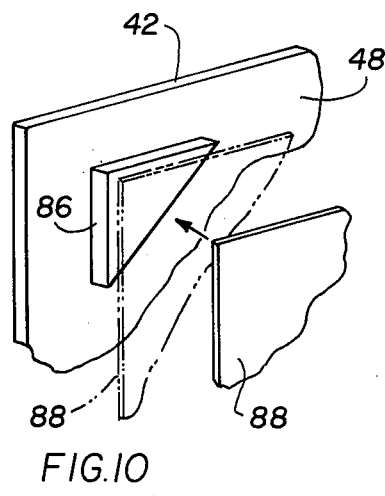
FIG. 10 is an enlargement of that portion circled at A in FIG. 1 and showing means to support various surfaces attached to the working areas; and, FIG. 11 shows a teaching contour or aid of the type stored in each tray.

Turning now to FIG. 10 and referring back to FIGS. 1 and 4, it will be seen that disposed at each corner of the second and third learning areas 48 and 16 are card holders 86. The card holders 86 detachably receive a learning or demonstration surface 88, one of which is shown, that may for example comprise a surface of magnetic material, a chalk board, a sheet of VELCRO, and the like.

Referring to FIG. 11 there is shown in detail an example of the learning objects, indicia or shapes 90 that comprise and may be housed in trays 72. Each tray is of modular design and in the example shown, the tray carries one or a plurality of the objects 90. The objects 90 are securely contained in a complimentary track 92 integral with tray 72. Consequently, each object 90 is detachable or removable from the track and can be held by the learner. The arrangement of objects or contours 90 in tray 72 as well as the tray itself can take on any desired shape. To illustrate, the tray can be divided into a plurality of racks 94 with each rack carrying a number of removable letters. Or, each tray can be of molded one piece construction whereby various learning contours are exposed to the child.

For certain learners it may be advantageous to insure maximum privacy and to insure minimum learner distraction. For this purpose an optional partition 96 can be hinged along the two opposed lateral edges of cover 42. With this construction and as shown in FIG. 1, the partitions can be swung to register with respective sides 12 and 14. When so positioned an increased degree of isolation is afforded by the carrel. During storage of the carrel, the optionally supplied partitions will fold, thereby allowing the cover to assume the configuration of FIG. 2.

In operation, cover 42 is opened as shown in FIG. 1. On the second learning area 48, the instructor might place a magnetic board 88 which will be held thereto by card holders 86. On the third learning area 16 the instructor might likewise place a magnetic board, not shown. The learner sits in chair 38 and reaching through window 18 slides either of covers 70 in their respective groove pair thereby exposing one of trays 72. In this example, the tray carries magnetic forms 90 whereby the learner can remove same and place it on either magnetic surface 88 or 16 comprising the second and third learning areas. Then, too, the instructor might place a chalk board on third working area 16 with the chalk board constrained thereon by card holder 86. Thus, the learner can kinesthetically and tactually perceive forms or indicia 90 by placing them on magnetic board 88 and reinforce this learning process by writing it on learning area 16 now comprised of chalk board.

To select different learning aids or forms 90, the exposed subcompartment of drum 50 is closed by sliding cover 70. Drum 50 is now rotated by knob 84, with the latter being placed for convenient access from the seat, thereby serially placing other drum compartments under window 18. This sequential operation is afforded by the "stop" action of axle 74 in aperture 78 referred to above. Trays comprising different types of materials can be exchanged in each subcompartment so that learning aids 90 in a given tray will comport with the learning surface retained and chosen for either or both second and third learning areas. Obviously then, there is a vast selection of combinations of surfaces that may be placed on either or both of the last two mentioned areas. And, equally so, the composition of trays 72 and aids 90 may be chosen from a wide variety of materials.

Both the second and third working surfaces 48 and 16 are major learning areas. Although either or both may be used by the instructor for demonstration purposes, it has been found that the second or vertical learning area is more often used for demonstration purposes. In either case, the use thereof is readily adaptable to the needs of the learner. And, as the learner progresses, cover 42 can be closed, as seen in FIG. 2. This action places the first learning surface 46 in an operable position. In this position, the learning carrel is used as and resembles an ordinary desk and the advanced learner may now use the area 46 in the same manner as any normal student.

While the drum has been shown having a square configuration, other shapes are contemplated. For example, the drum may have two, seven, or any number of compartments. Indeed, even a non rotatable compartment may be used. In the event other drum configurations are used, the surface of axle 74 and hence that portion of aperture 78 upon which it bears, will change. The change will be made so as to insure registration of the drum compartments under window 18 as the drum stops with the action referred to above.

While only a few embodiments of the present invention have been shown and described, it is to be understood that many changes and modifications can be made thereto without departing from the spirit and scope thereof.

What is claimed is:

1. A learning carrel having various learning aids adapted for display on demonstration surfaces comprising a desk having two learning areas one of which is movably connected with said desk for movement to and from an open learning position with the open position being substantially perpendicular to the other of said learning areas, means for attaching the various learning aids to the demonstration surfaces of said learning areas so that the various learning aids can be detachably affixed to said learning areas, said desk having a top side defining said other of said learning areas, a rotatable drum disposed in the carrel comprising a plurality of compartments wherein the various learning aids are selectable from said drum and storable therein, and an access window defined in said desk top side to permit access therethrough to said plurality of compartments.

2. The carrel of claim 1 further including a pencil well for storing writing paraphernalia.

3. The carrel of claim 1 further including an adjustable seat integral with and extending from said desk.

4. The carrel of claim 1 wherein said means comprises a plurality of card holders.

5. The carrel of claim 1 further including a shelf adjacent said top side and disposed thereunder.

6. Apparatus for use in learning and adapted to display objects on a selected surface and having a first learning area, a second learning area and a third learning area, said apparatus comprising the combination of a desk having a top side, a cover with an upperside and an opposed underside and adapted to move between a closed and an open position relative to the desk top, and means for attaching the selected surface to the desk top and the cover underside so that when said cover is in the closed position the upperside thereof defines the first learning area and when said cover assumes the open position, the underside thereof defines the second learning area, with the third learning area being defined by the desk top whereby the objects can be detachably mounted on the second and third learning areas, a member on said apparatus rotatable to present a compartment wherein learning objects are stored, and an opening in said third learning area to provide access to said compartment and the objects therein.

7. In a carrel for use in reinforced learning that includes a desk having a top side learning surface and a cover movable thereon, the cover operable to move between an open and closed position relative to the desk top thereby providing a plurality of learning areas, a drum rotatably disposed in the desk and having a plurality of compartments, means for turning said drum so that one of said plurality of compartments is accessible from the top side of the desk, wherein the top side of the desk has an access window disposed therethrough, and wherein each of said plurality of compartments is adapted for serial placement thereunder.

8. The carrel of claim 7 wherein the desk has at least two sides spaced parallel opposed between which said drum rotates.

9. The carrel of claim 7 wherein said means comprises at least one axle connected to said drum, and an aperture in one of said parallel opposed sides with said aperture being adapted to rotatably journal said axle.

10. The carrel of claim 7 wherein said drum further comprises tray means adapted for placement in each of said plurality of compartments, and a plurality of learning aids detachably affixed to said last mentioned means.

11. The carrel of claim 10 wherein said tray means includes a plurality of trays, and wherein said plurality of learning aids are detachable from their respective one of said plurality of trays.

12. The carrel of claim 7 wherein said drum comprises two end pieces, each being disposed at opposed longitudinal ends thereof, an axle extending outboard from each of said drum ends, and wherein said desk includes a pair of spaced parallel opposed sides each having an aperture formed therethrough to thereby journal said axles therebetween and rotatably suspend said drum.

13. The carrel of claim 12 wherein a plurality of partitions divide each of said plurality of compartments into a plurality of subcompartments.

14. The carrel of claim 12 wherein one of said axles has at least one flat area on a peripheral portion thereof with the number of flats operable with the number of said plurality of compartments, and wherein the respective aperture in which said one axle bears has a peripheral portion adapted to receive said flats whereby said drum will rotate with a stop action with each of the stops registering one of said plurality of compartments under said window.

15. The carrel of claim 12 wherein one of said opposed sides is formed with a handle well, and wherein said means includes a handle disposed in said well and adapted to rotate said drum.

16. Apparatus for displaying learning aids on a selected surface for use in reinforced learning including first, second and third learning areas, the apparatus comprising the combination of a carrel having a top, a hinged cover defined by a top side and an underside, said cover being adapted to move between an up and a down position, in the down position said cover closing the carrel top with the top side of said cover comprising the first learning area, in the up position the underside of said cover acting as the second learning area with the now exposed carrel top acting as the third learning area, a window positioned in the carrel top, a drum having at least one compartment, means for rotating said drum and adapted to maintain registration of the selected compartment under said window, at least one modular tray adapted for placement in the compartment, and means for attaching the selected surface to the second and third learning areas.

17. The apparatus of claim 16 further including slide means for retaining the tray in said drum when same is rotated.

* * * * *